United States Patent
Satvilkar et al.

(10) Patent No.: US 11,155,189 B2
(45) Date of Patent: Oct. 26, 2021

(54) BUMPER ASSEMBLY FOR VEHICLE SEAT

(71) Applicant: Honda Motor Co., Ltd., Tokyo (JP)

(72) Inventors: Prakalp Arun Satvilkar, Marysville, OH (US); Aruna Kumara, Marysville, OH (US); Brian D Large, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 78 days.

(21) Appl. No.: 16/790,302

(22) Filed: Feb. 13, 2020

(65) Prior Publication Data

US 2021/0253005 A1    Aug. 19, 2021

(51) Int. Cl.
*B60N 2/54* (2006.01)
*B60N 2/015* (2006.01)
*F16B 21/07* (2006.01)
*F16B 21/18* (2006.01)

(52) U.S. Cl.
CPC ............. *B60N 2/542* (2013.01); *B60N 2/015* (2013.01); *F16B 21/073* (2013.01); *F16B 21/186* (2013.01); *Y10T 16/10* (2015.01); *Y10T 16/61* (2015.01); *Y10T 24/44026* (2015.01)

(58) Field of Classification Search
USPC ....... 296/63, 64, 65.01, 65.03, 65.05, 65.02, 296/65.08, 65.09, 65.11, 65.12
See application file for complete search history.

(56) References Cited

U.S. PATENT DOCUMENTS

| 3,198,473 A | 8/1965 | Holz |
| 4,664,574 A | 5/1987 | Kasai |
| 5,241,725 A * | 9/1993 | Hamatani ............... E05F 5/025 16/82 |
| 5,651,632 A * | 7/1997 | Gordon ................... F16B 21/06 24/662 |

(Continued)

FOREIGN PATENT DOCUMENTS

| EP | 1927500 A2 | 6/2008 |
| JP | 2005074051 A * | 3/2005 |

(Continued)

OTHER PUBLICATIONS

Espacenet Machine Translation of EP Patent No. 1927500 A2, Issued Jun. 4, 2008.

(Continued)

*Primary Examiner* — David E Allred
(74) *Attorney, Agent, or Firm* — Plumsea Law Group, LLC

(57) ABSTRACT

A bumper assembly for a vehicle seat damper includes a bumper cap and a grommet configured to engage the bumper cap. The bumper cap includes a protruding central portion having a supporting rib structure within the protruding central portion. Further, a vehicle seat assembly includes a vehicle seat configured to be removably installed on a vehicle floor of a vehicle, the vehicle seat including a seat damper, and a bumper assembly configured to be installed on the vehicle floor such that the bumper assembly contacts the seat damper when the vehicle seat is installed on the (Continued)

vehicle floor. When the vehicle seat is installed on the vehicle floor, the seat damper contacts the bumper assembly and the bumper assembly then contacts a body panel of the vehicle so as to provide support for the vehicle seat assembly.

8 Claims, 5 Drawing Sheets

(56) References Cited

U.S. PATENT DOCUMENTS

| | | | | |
|---|---|---|---|---|
| 5,836,049 | A * | 11/1998 | Chiang | E05C 17/50 16/82 |
| 6,757,945 | B2 | 7/2004 | Shibuya et al. | |
| 7,945,992 | B2 | 5/2011 | Parisi et al. | |
| 9,669,745 | B2 * | 6/2017 | Machida | F16B 2/02 |
| 2004/0168381 | A1 * | 9/2004 | Rissone | E06B 3/9632 52/211 |
| 2010/0212119 | A1 * | 8/2010 | Dendo | B60N 3/046 24/453 |
| 2010/0287748 | A1 * | 11/2010 | Courtin | B60N 3/046 24/700 |
| 2011/0057423 | A1 * | 3/2011 | Tago | F16B 19/1081 280/728.2 |
| 2013/0287996 | A1 * | 10/2013 | Masanek, Jr. | B60N 3/044 428/131 |
| 2015/0210197 | A1 * | 7/2015 | Kaufman | F16B 19/00 296/97.23 |
| 2020/0164782 | A1 * | 5/2020 | Park | B62D 65/14 |

FOREIGN PATENT DOCUMENTS

| | | |
|---|---|---|
| KR | 200186727 Y1 | 6/2000 |
| KR | 20130003709 U | 6/2013 |

OTHER PUBLICATIONS

Espacenet Machine Translation of Published KR Patent Application No. 20130003709 U, Issued Jun. 21, 2013.

* cited by examiner

BUMPER ASSEMBLY FOR VEHICLE SEAT

BACKGROUND

The present disclosure relates to a bumper assembly for a vehicle seat and, more particularly, to a bumper assembly having a bumper cap and a grommet for contacting a seat damper on the vehicle seat.

Various vehicles include carpeted interior spaces and trunks. For example, the floor in an interior cabin of an automobile or minivan may be carpeted. Often too, vehicles may include seats which can be installed and removed by the consumer depending upon the number of people or use of the vehicle at any given time. In order to provide adequate support for such removable seats, plastic covers (garnishes) for the mounting elements are installed and attached to the vehicle body. With the vehicle seats installed onto the mounting elements, the rubber seat dampers on the underside of the seat contact the plastic covers and thus create sufficient friction to withstand the various vehicle seat forces encountered during installation, removal and use of the seat while the vehicle is in motion. When the vehicle seat is removed, however, the plastic covers over the mounting elements remain in the vehicle and can thus lessen the aesthetic appeal of the carpeted interior appearance. Moreover, the large plastic covers are subject to be scratched and broken with repeated installation and removal of the vehicle seat.

There is a need in the art for a system and method that provides adequate support and friction for the forces required by the vehicle seat damper, but which also provides a visually appealing interior surface.

SUMMARY

A bumper assembly for a vehicle seat according to the disclosure herein provides a contact surface with increased strength which can meet predetermined seat bumper force requirements. The bumper assembly is relatively small and discreet such that when the vehicle seat is removed, the interior carpeting of the vehicle still has an aesthetically pleasing appearance.

In one aspect, the disclosure provides a bumper assembly for a vehicle seat damper including a bumper cap, and a grommet configured to engage the bumper cap, wherein the bumper cap includes a protruding central portion having a supporting rib structure within the protruding central portion.

Further, a system and method for installing a bumper assembly for a vehicle seat damper includes providing a bumper assembly having a bumper cap and a grommet, the bumper cap having a protruding central portion configured to engage the grommet; forming a fitting hole in a vehicle carpeting, the fitting hole being dimensioned for the protruding central portion to pass therethrough; positioning a central opening in the grommet underneath the fitting hole in the vehicle carpeting; pressing the protruding central portion of the bumper cap through the fitting hole in the vehicle carpeting and into the central opening in the grommet such that the protruding central portion engages the grommet therebelow; and thereby retaining the vehicle carpeting disposed between the bumper cap and the grommet.

In another aspect, the disclosure provides a vehicle seat assembly including a vehicle seat configured to be removably installed on a vehicle floor of a vehicle, the vehicle seat including a seat damper; a bumper assembly configured to be installed on the vehicle floor such that the bumper assembly contacts the seat damper when the vehicle seat is installed on the vehicle floor; wherein, when the vehicle seat is installed on the vehicle floor, the seat damper contacts the bumper assembly and the bumper assembly contacts a body panel of the vehicle so as to provide support for the vehicle seat assembly.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

Figure 5A:
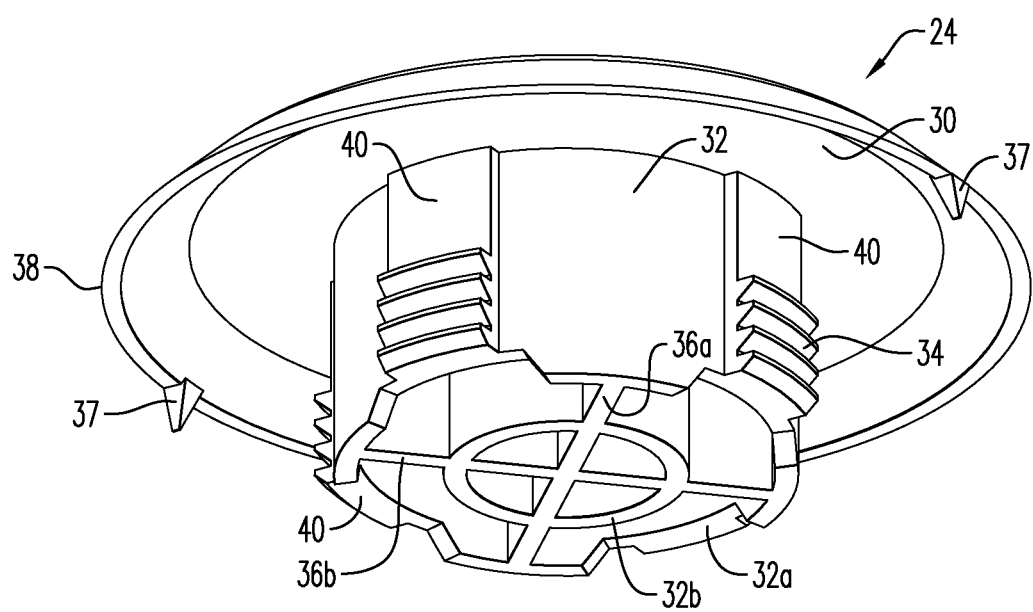
FIG. 5A is a bottom perspective view of a bumper cap according to an exemplary embodiment of the disclosure herein.

FIB. 5B is a bottom plan view of the bumper cap shown in FIG. 5A.

Figure 6A:
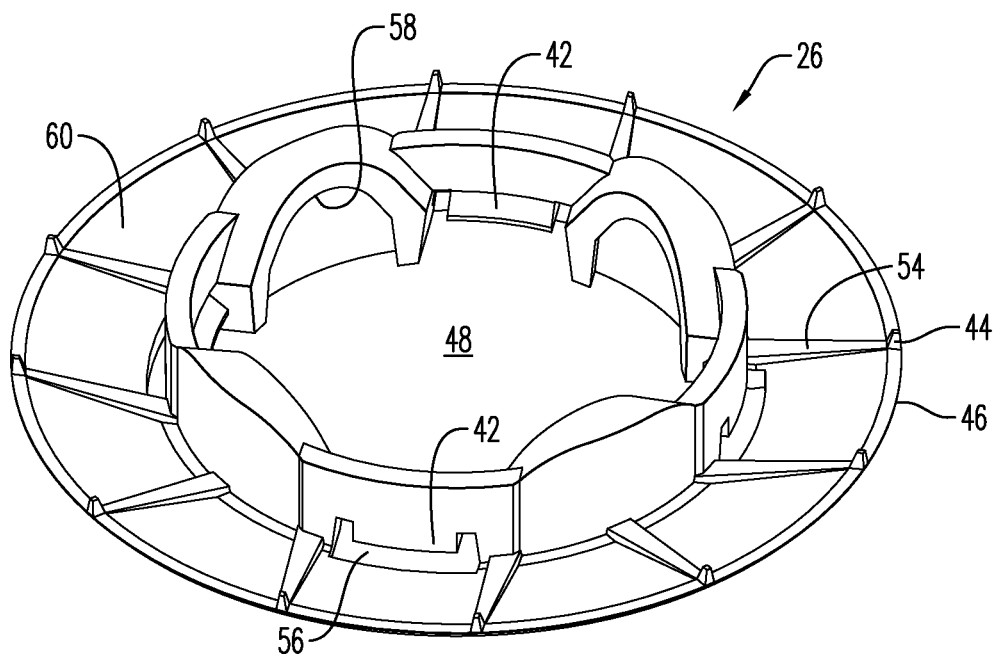

FIG. 6A is a top perspective view of a grommet according to an exemplary embodiment of the disclosure herein.

FIB. 6B is a top plan view of the grommet shown in FIG. 6A.

Figure 6B:
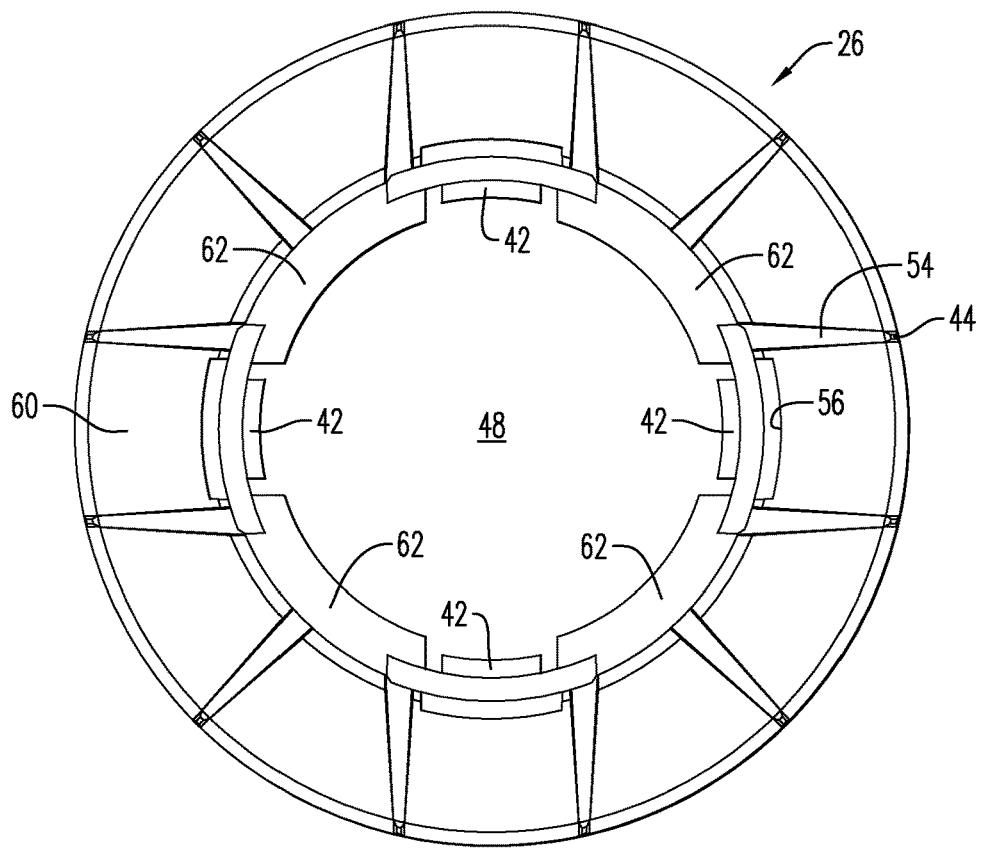
Figure 6C:
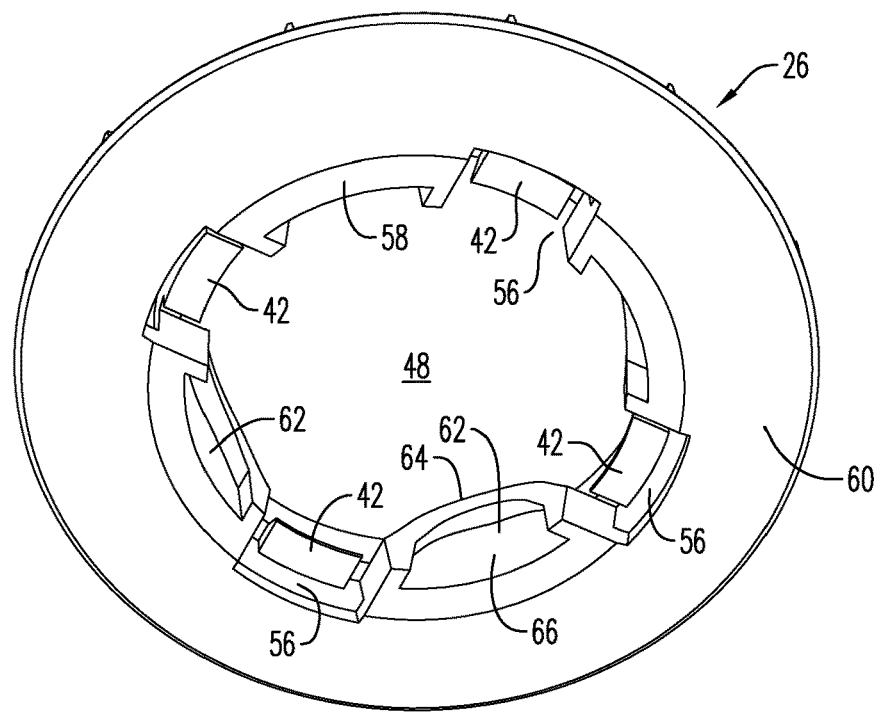

FIG. 6C is a bottom perspective view of the grommet shown in FIG. 6A.

DETAILED DESCRIPTION

A bumper assembly for a vehicle seat according to the disclosure herein provides a contact surface with increased strength in order to meet predetermined seat bumper force requirements, while still maintaining an aesthetically pleasing appearance within the interior of the vehicle when the vehicle seat is removed.

Figure 1:
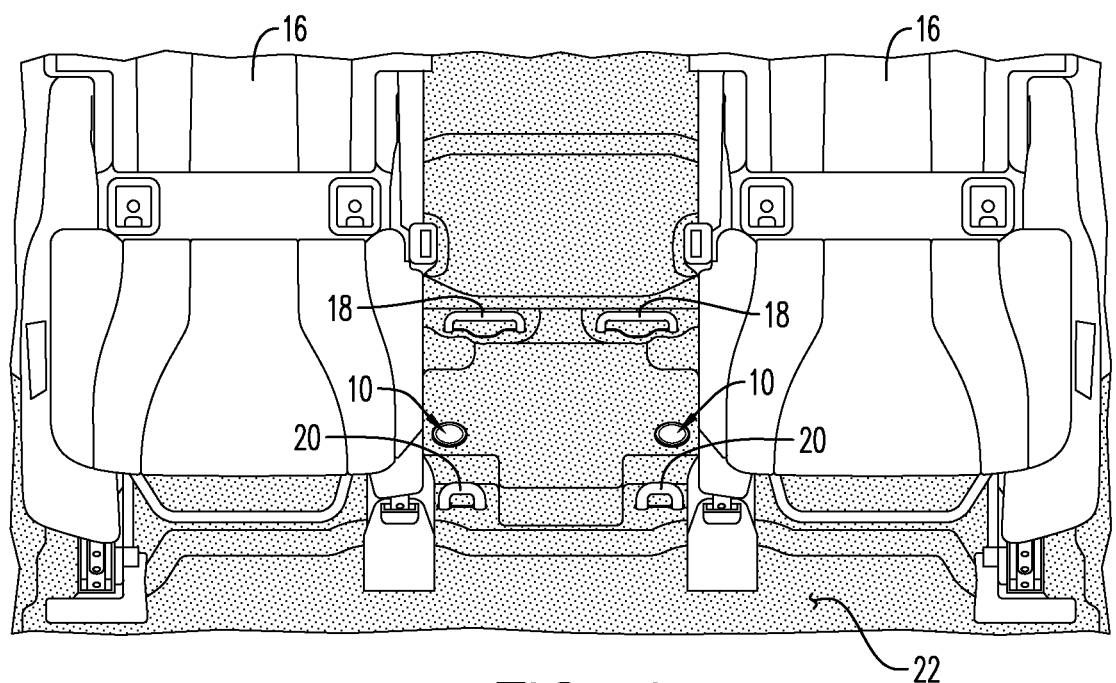
FIG. 1 is a schematic view illustrating an exemplary bumper assembly within the interior of a vehicle, when a vehicle seat thereover is removed.
Figure 2:
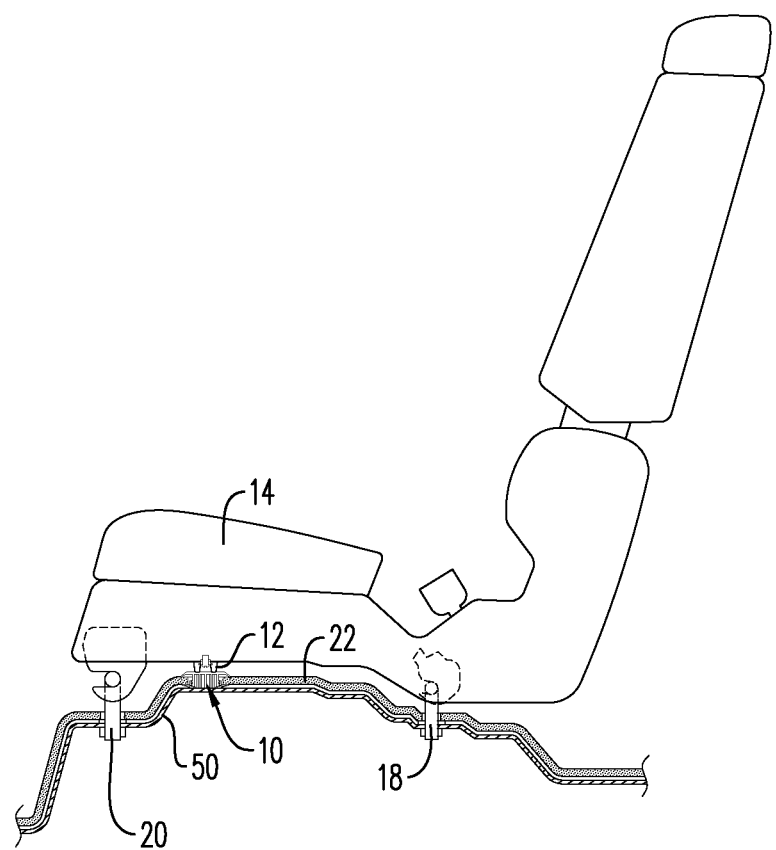
FIG. 2 is a schematic view illustrating the exemplary bumper assembly shown in FIG. 1 with a vehicle seat installed thereover.

Referring to the accompanying drawings and more particularly to FIGS. 1 and 2, an exemplary embodiment of the bumper assembly according to the disclosure herein is shown generally by reference numeral 10. The bumper assembly 10 is configured to engage a seat damper 12, generally a rubber damper, disposed on a vehicle seat 14 in a vehicle. When the vehicle seat 14 is installed in the vehicle, the seat damper 12 contacts the bumper assembly 10, which absorbs the force exerted thereto and provides the traction required to assist in securing the vehicle seat against movement in all directions when the vehicle is in motion. Direct contact between the seat damper 12 and the carpet 22 within the vehicle interior does not provide an adequate frictional force to assist with securing the vehicle seat in place during vehicle motion. Hence, the bumper assembly 10 is generally made from a plastic material such as polyoxymethylene (POM) or polypropylene (PP), but any material capable of providing sufficient frictional resistance with the seat damper 12 could also be used. The bumper assembly 10 is also in contact with the body panel 50 of the vehicle therebelow in order to provide increased support and, more particularly, the bumper assembly 10 is aligned within the interior of the vehicle to act as a bridge between the seat damper 12 and the body panel 50. The seat force requirements are predetermined based upon the size and weight of the seat, position of the seat within the vehicle, vehicle construction, occupant weight and size (center of gravity), vehicle acceleration G forces, and other vehicle conditions and specifications. The bumper assembly 10 is thus configured to support a maximum predetermined seat force that may be encountered on a floor bumper disposed beneath the seat damper of the vehicle seat. Typically, the vehicle seat 14 includes a frame having a seat portion and a back portion. The seat portion may have first and second hooks and the back portion may have first and second fixing mechanisms. The floor of the vehicle thus includes hook catches 20 to receive the hooks on the vehicle seat 14 and latching mechanisms 18 configured to engage the fixing mechanism on the vehicle seat 14. The vehicle seat 14 may be configured to lock into place in a fully upright position when the vehicle is in operation and can also be easily removed by the consumer. When vehicle seat is removed from the vehicle, such as when a middle seat 14 is removed from between two seats 16 as shown in FIG. 1, the bumper assembly 10 remains on the floor of the vehicle and has minimal influence on the overall carpeted and aesthetically pleasing appearance of the vehicle interior. That is, rather than a plastic cover extending over the entirety of the hook catches 20 and/or latches 18, the bumper assembly 10 causes only a relatively small, discrete area of carpet disturbance and does not detract from the interior appearance of the vehicle. For instance, a diameter of the bumper assembly 10 may be approximately 25 cm to 100 cm in the exemplary embodiment, but larger and smaller diameters are also possible within the scope of the disclosure.

Figure 3A:
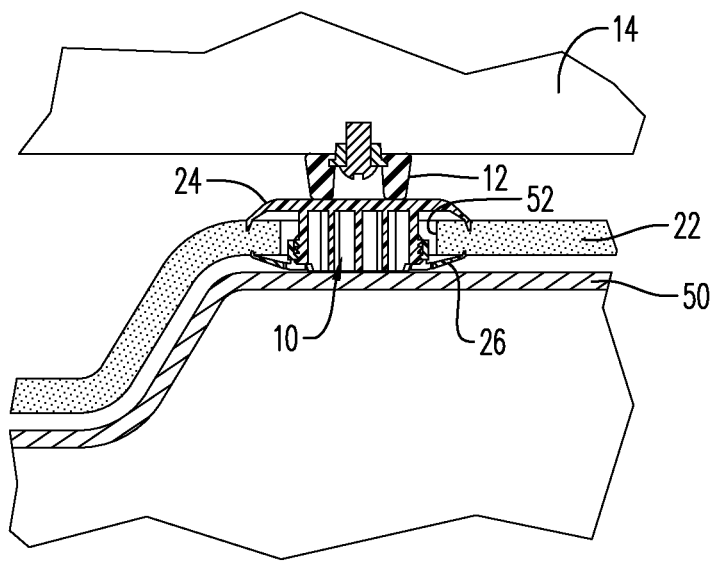
FIG. 3A is an enlarged view of the bumper assembly shown in FIG. 2.
Figure 3B:
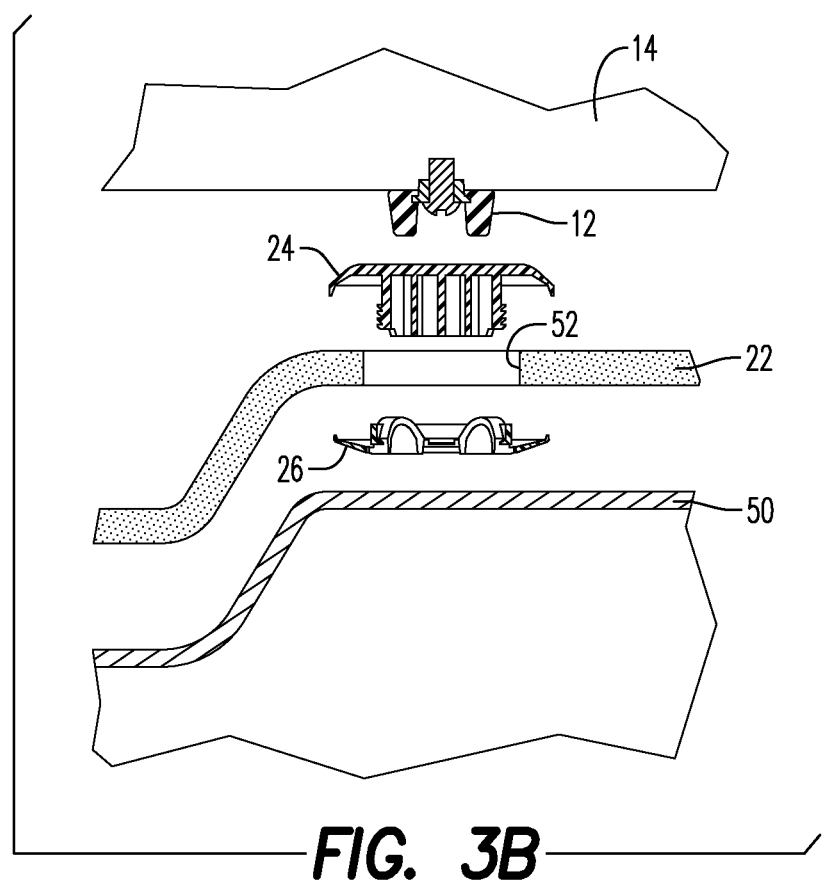
FIG. 3B is an enlarged, exploded view of the bumper assembly shown in FIG. 2.
Figure 4:
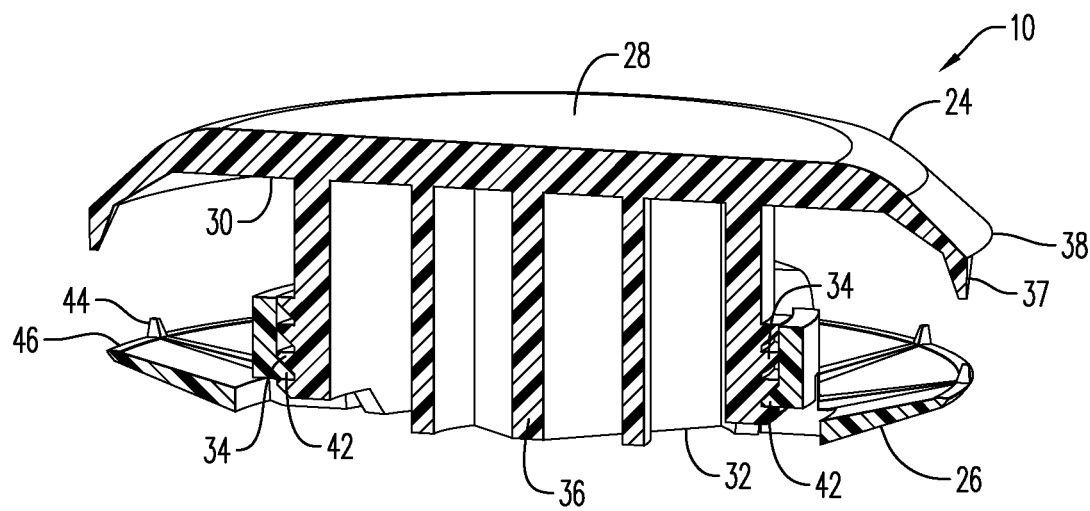
FIG. 4 is a cross sectional view of an exemplary bumper assembly according to the disclosure herein.

The bumper assembly 10 is circular in shape according to the exemplary embodiment discussed below, but other shapes could of course also be used depending upon the configuration of the seat damper on the vehicle seat and the vehicle into which the bumper assembly is being installed. With reference also to FIGS. 3A, 3B and 4, the bumper assembly 10 includes a bumper cap 24 configured to engage a grommet 26, with the vehicle flooring material, such as carpet 22, disposed between the bumper cap 24 and the grommet 26. Thus, when the vehicle seat is removed, only the bumper assembly 10 is visible and it presents a substantially flush surface with the surface of the carpet 22.

Figure 5B:
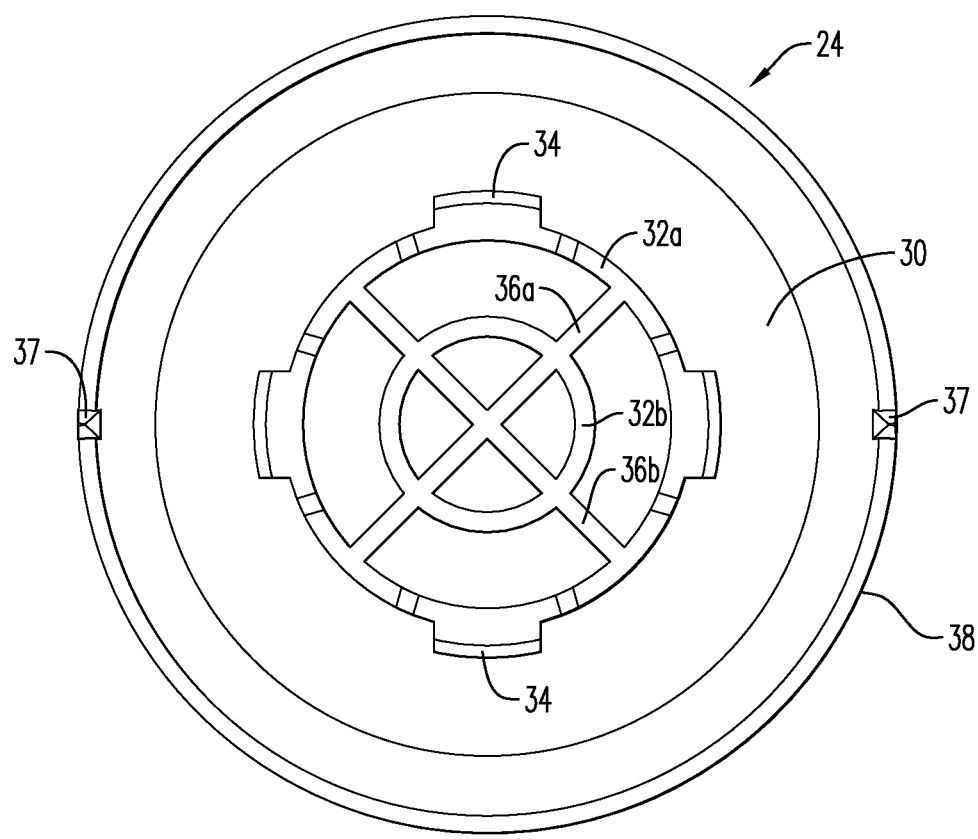

The bumper cap 24 includes a substantially flat upper surface 28 visible above the carpeting 22 within the interior of the vehicle and a substantially concave lower or under surface 30. The under surface 30 of the bumper cap 24 includes a protruding central portion 32. In the exemplary embodiment of the disclosure, as best shown in FIGS. 5A and 5B, the protruding central portion 32 includes an outer cylindrical portion 32a and an inner cylinder 32b joined by a plurality of ribs 36. The inner cylinder 32b and ribs 36 provide increased strength and support to the bumper cap 24 to meet the maximum force requirements dictated by the impact of the seat damper 12 during installation of the vehicle seat 14. The ribs 36 are defined by ribs 36a, 36b extending across the diameters of the outer cylindrical portion 32a and the inner cylindrical portion 32b. The protruding central portion 32 further includes a plurality of locking tabs 40 spaced about the outer periphery of the outer cylindrical portion 32a. Each of the tabs 40 is rigidly formed with the bumper cap 24 and also includes a plurality of teeth 34 disposed on the lower, terminal ends of the tabs 40 for engagement with the grommet 26, as discussed below. The bumper cap 24 also has a plurality of nubs 37 in an equally spaced relationship around the outermost circumference of the bumper cap 24 so that when the bumper cap 24 is assembled with grommet 26, the nubs 37 catch the upper side of the carpet 22 within the vehicle and thereby prevent the bumper cap 24 from rotating relative to the carpet 22.

Referring also to FIGS. 6A-6C, an exemplary embodiment of grommet 26 is illustrated. The grommet 26 includes an upstanding central portion 58 defining a central opening 48 configured to receive the protruding central portion 32 of the bumper cap 24 and a peripheral flange 60 extending around the central portion 58. The central portion 58 is defined by a plurality of wall portion 62 and snaps 42. The wall portions 62 include arcuate portions 64 which define recessed areas 66 within the central portion 58. The arcuate portions 64 and recessed areas 66 define guide surfaces to assist with alignment between the bumper cap 24 and grommet 26 during assembly. The plurality of snaps 42 extending around the central portion 58 are configured to engage the teeth 34 on the tabs 40 of the protruding central portion 32 of the bumper cap 24. Each of the snaps 42 interlocks with a corresponding tab 40 via the teeth 34 and thereby secures the bumper cap 24 to the grommet 26. The snaps 42 are spaced from the central portion 58 by an opening 56 which provides a degree of flexibility to the snap 42 so it can engage and interlock with the teeth 34 on the tabs 40 being inserted therein, i.e., snap lock. As shown best in FIG. 6A, the top surface of the grommet 26 (the surface which faces the underside of carpet 22) includes a plurality of struts 54 extending around the perimeter of the central opening 48. At the outer circumference 46 of the grommet 26, each of the struts 54 also includes a nub 44 or small projection to catch or bite the lower side of carpet 22 when the grommet 26 is assembled with the bumper cap 24 and thereby assist in securing the bumper assembly 10 against rotation relative to the carpet.

When the bumper cap 24 and grommet 26 are assembled and are to be attached to carpet 22, the carpet 22 is formed with a fitting hole 52 in a selected position where the bumper assembly 10 is to be attached. The fitting hole 52 has a diameter slightly larger than the outer diameter of the central opening 48 of the grommet 26. The grommet 26 is placed under the fitting hole 52 in the carpet 22, i.e., under the carpeting to be installed in the vehicle, and the central portion 32 of the bumper cap 24 is pressed through the hole 52 in the carpet 22 and into the central opening 48 in the grommet 26 until the teeth 34 of the bumper cap 24 engage the snaps 42 on the grommet 26 to thereby attach the bumper assembly 10 to the carpet 22 as shown in FIG. 3A. The carpet 22 is thereby sandwiched between the bumper cap 24 and the grommet 26. The ribs 36 of the bumper cap 24 will contact the body panel 50 of the vehicle when the seat 14 is locked in place and the bumper assembly 10 is engaged by the seat damper 12. That is, the force and weight of the seat 14 can be transmitted through the bumper assembly 10 to the body panel 50 based upon the ribs 36 within the central portion 32 of the bumper cap 24. While the exemplary embodiment of ribs 36 shown in the disclosure here are formed as straight intersecting projections, the ribs could also be formed in other configurations or shapes within the protruding central portion 32 of the bumper cap 24, such as concentric cylinders, round protruding pillars, patterned or non-pattered rib structure, and the like, so long as the structure of the ribs is sufficient to support the maximum predetermined force of the vehicle seat.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A vehicle seat assembly comprising:
    a vehicle seat configured to be removably installed on a vehicle floor of a vehicle, the vehicle seat including a seat damper;
    a bumper assembly configured to be installed on the vehicle floor such that the bumper assembly non-attachingly contacts the seat damper when the vehicle seat is installed on the vehicle floor;
    wherein, when the vehicle seat is installed on the vehicle floor, the seat damper contacts the bumper assembly and the bumper assembly contacts a body panel of the vehicle so as to provide support for the vehicle seat assembly; wherein the bumper assembly includes a bumper cap and a grommet configured to attachingly engage the bumper cap;
    wherein the seat damper is formed from rubber and the bumper assembly is formed from plastic such that contact between the seat damper and the bumper assembly creates a frictional resistance.

2. The vehicle seat assembly according to claim 1, wherein the bumper cap includes a protruding central portion having a supporting rib structure within the protruding central portion, the supporting rib structure configured to contact the body panel of the vehicle when the vehicle seat is installed on the vehicle floor.

3. The vehicle seat assembly according to claim 2, wherein the protruding central portion includes an outer cylindrical portion and the supporting rib structure includes at least an inner cylindrical portion, the inner cylindrical portion being concentric with the outer cylindrical portion.

4. The vehicle seat assembly according to claim 3, wherein the supporting rib structure further includes at least one rib extending across a diameter of the outer cylindrical portion.

5. The vehicle seat assembly according to claim 2, wherein the protruding central portion further includes a plurality of locking tabs, each of the locking tabs having a plurality of teeth disposed at a lower edge thereof.

6. The vehicle seat assembly according to claim 5, wherein the grommet includes a plurality of locking snaps, the locking snaps being configured to engage the teeth on the locking tabs when the protruding central portion is inserted into a central opening of the grommet.

7. The vehicle seat assembly according to claim 6, wherein the grommet includes a central portion and openings defined between the locking snaps and the central portion.

8. The vehicle seat assembly according to claim 1, wherein the bumper assembly is separate and discreet from a vehicle seat latching mechanism.

* * * * *